Nov. 20, 1923.　　　　　　　　　　　　　　　　　　1,474,904
H. M. JONES
MEASURING DEVICE
Filed July 16, 1920　　　　　2 Sheets-Sheet 1

Inventor:
Harry M. Jones,
By Dyrenforth, Lee, Chritton & Wiles,
Attys

Nov. 20, 1923. 1,474,904
H. M. JONES
MEASURING DEVICE
Filed July 16, 1920 2 Sheets-Sheet 2

Inventor:
Harry M. Jones,
By Dyrenforth Lee Chritton & Niles,
Attys

Patented Nov. 20, 1923.

1,474,904

UNITED STATES PATENT OFFICE.

HORRY M. JONES, OF CHICAGO, ILLINOIS.

MEASURING DEVICE.

Application filed July 16, 1920. Serial No. 396,780.

*To all whom it may concern:*

Be it known that I, HORRY M. JONES, a citizen of the United States, residing at Chicago, in the county of Cook and State of Illinois, have invented a new and useful Improvement in Measuring Devices, of which the following is a specification.

This invention relates to improvements in measuring devices and more especially to a device for measuring the amount and rate of oxygen consumption by a human being in the breathing process. It is especially designed for use in the practice of medicine for the purpose of diagnosis and the detection of the presence of disease or other pathological conditions; it has been found that the amount and rate of oxygen consumption in the lungs is an indication of the rate of metabolism. It is obvious, also, that the device can be used with the normal individual, if, for any reason, it is desired to ascertain the rate and amount of oxygen consumption.

Although the machine, as stated, is especially designed for use in the practice of medicine for the purposes set forth it is obvious that, without detracting from the spirit of this invention, it may be used for other purposes with the necessary modifications. In other words, the device is adapted for use, in general, in any cases where for any reason, it is desired to measure or ascertain the amount of oxygen absorbed, used or taken up by any subject, living or dead.

The foregoing features and others of my invention will appear more fully as I proceed with my specification.

Figure 1:
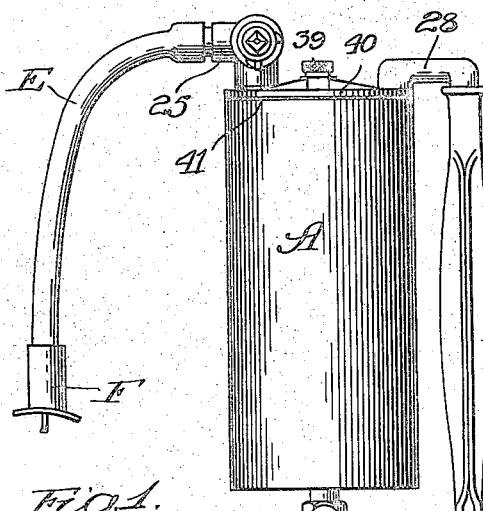
Figure 2:
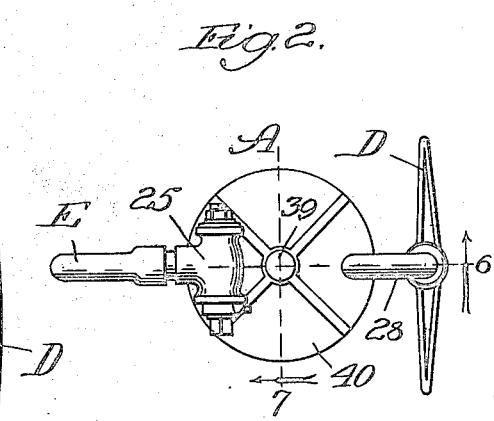
Figure 3:
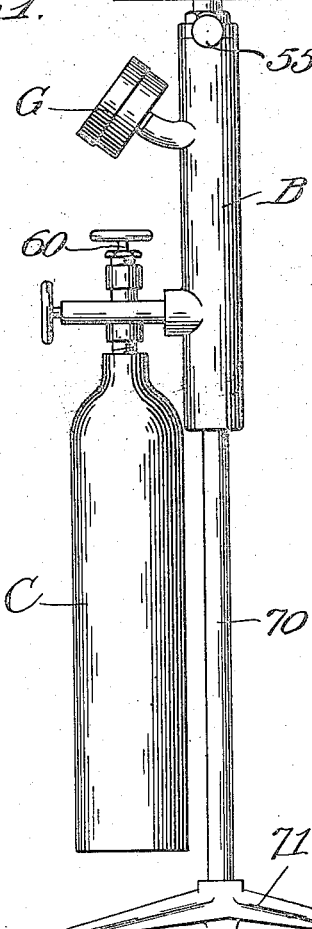
Figure 3:
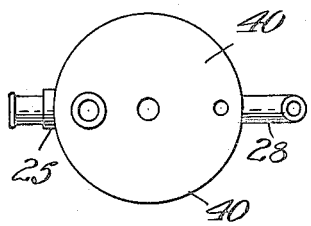
Figure 4:
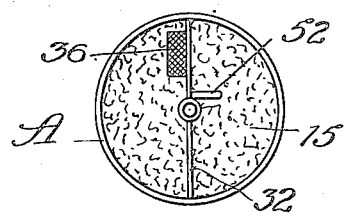
Figure 5:
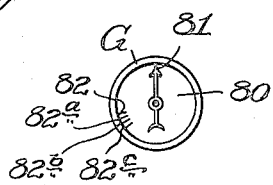
Figure 6:
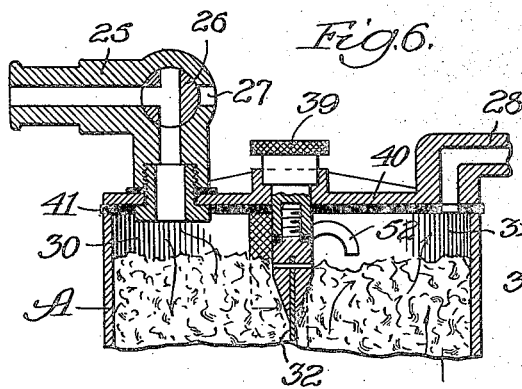
Figure 7:
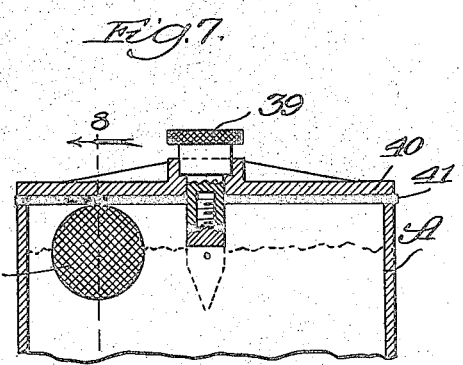
Figure 9:
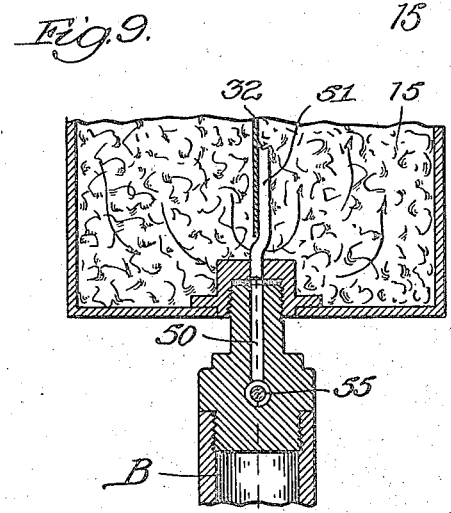
Figure 8:
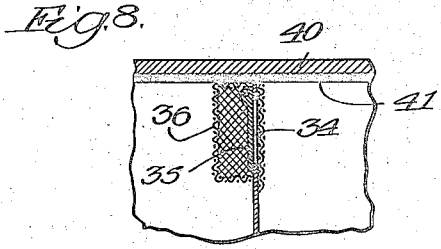
Figure 10:
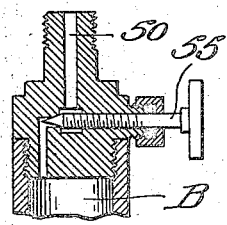
Figures 11, 12:
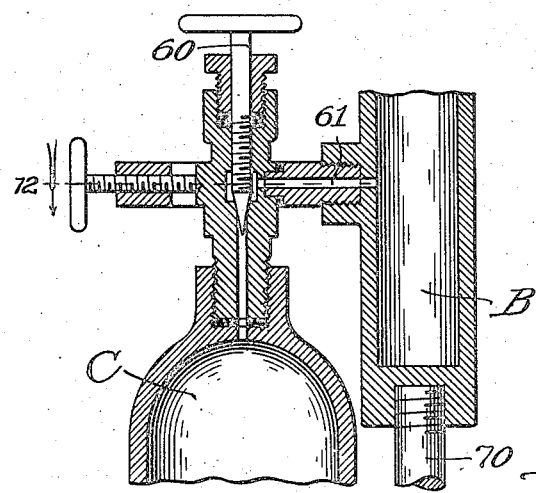

A device embodying the features of my invention is shown in the accompanying drawings in which, Figure 1 is a view in side elevation of the device. Fig. 2 is a top plan view. Fig. 3 is a plan view of the under side of the top or cover of the charcoal container. Fig. 4 is a top plan view of the device with the cover removed. Fig. 5 is a plan view of the face of the pressure gage used in connection with the device. Fig. 6 is a longitudinal vertical sectional view of the upper part of the device taken as indicated by the line 6 of Fig. 2. Fig. 7 is a transverse vertical sectional view of the upper part of the device taken as indicated by the line 7 of Fig. 2. Fig. 8 is a vertical sectional view taken as indicated by the line 8 of Fig. 7. Fig. 9 is a longitudinal vertical sectional view of the lower part of the charcoal container and upper part of the pressure measuring tank. Fig. 10 is a vertical sectional view taken as indicated by the line 10 of Fig. 9. Fig. 11 is a longitudinal vertical sectional view showing the lower part of the pressure measuring tank and the top of the oxygen tank. Fig. 12 is a horizontal sectional view taken or indicated by the line 12 of Fig. 11.

As shown in said drawings A indicates in general a charcoal container; B, a pressure measuring tank; C, a tank containing compressed oxygen; D, a rubber breathing bag; E, a breathing tube; F, a mouthpiece; and G, a pressure gage. The container A is cylindrical in form and nearly filled with charcoal covered with a solution of sodium hydroxide (indicated by 15) for a purpose to be explained hereinafter. The breathing tube E is fastened to an elbow pipe 25 leading into one side of the top of the charcoal container A and provided with a three way valve 26 and an outlet port 27. The top of the charcoal container A, on the side opposite the pipe 25, is also provided with a U-shaped pipe 28 to which is attached the rubber breathing bag D. The charcoal container A is divided into two compartments 30 and 31 respectively by means of a gas tight partition 32 extending from the top of the container downwardly to a point about one inch from the bottom. The opening through the pipe 25 leading from the breathing tube E enters the compartment 30, and the pipe 28 leading from the breathing bag D enters the compartment 31. The partition 32 is provided at the top with a small circular port 34 covered by a light swinging vane, or flutter valve 35 of any suitable construction and design to permit the passage of air from the compartment 31 to the compartment 30 through the port 34 but not in a reverse direction. The valve 35 for protection is covered by a suitable screen or grating 36. As shown in Fig. 6 the charcoal 15 in the container A is not filled entirely to the top but a space of about one inch is left in order to permit the free passage of gas from the top of compartment 31 through the port 34 into the compartment 30. A suitable retaining screw 39 is provided for fastening down the cover or top 40 on the charcoal container, and a suitable gasket or washer 40 is provided in order to make the parts gas tight. It is to be understood that there is no communication between the compartments 30 and 31 except below the partition 32, or through the port 34 (in one direction).

Fastened to the bottom of the charcoal container A at its center is the pressure measuring tank B which is a hollow cylinder having a port 50 leading from its upper end terminating in the pipe 51 leading up through the charcoal container A with its upper end curved downwardly as indicated by 52 and terminating in the upper part of the compartment 31 above the surface of the charcoal.

Communication from the pressure tank B to the port 50 is controlled by a valve 55.

Near the lower end of the pressure tank B is joined in any suitable manner a tank C containing compressed oxygen with a valve 60 arranged to permit the admission of gas from the tank C into the pressure tank B through the inlet port 61. No invention is involved in the particular construction of the oxygen tank or the manner of attaching it to the pressure tank B since devices of this sort are old in the art.

The machine is supported by a suitable rod or standard 70 mounted in the lower end of the pressure tank B and held upright by the tripod 71.

It will be noted, that the machine is so constructed that the container A may be separated from the pressure tank B by loosening the two parts at the threaded joint provided, and likewise the standard 70 may be unscrewed from the pressure tank B. A suitable collar 75 and clamping screws 76 of any desired construction are provided for holding the oxygen tank C in place. These parts also may readily be loosened permitting the removal of the oxygen tank. It will thus be seen that the machine may readily be knocked down for the purpose of packing or carrying.

The pressure gage G has an opening leading into the pressure tank B and is adapted to give an indication of the pressure of gas therein. It may be of any suitable form or construction. The gage G is provided with an indicating hand 81, and its face 80 has upon it a series of markings 82, $82^a$, $82^b$, etc. By the trial and error method or in any other suitable way the gage is so adjusted and the markings are so placed that at a given temperature the recording hand 81 will coincide with one of the marks when the pressure tank B contains such a quantity of oxygen that when the valve 55 is opened there will escape from the tank B into the charcoal container A through the pipe 52 a predetermined volume of oxygen at such temperature. Likewise the other marks $82^a$, $82^b$, etc., are each located with respect to a certain given temperature. For example, the mark $82^b$ is so located that at a temperature of 70° Fahrenheit, when the hand 81 stands at the mark $82^b$ and the valve 60 is shut off and the valve 55 opened there will escape through the pipe 52 one liter of oxygen at such temperature of 70°. Likewise, if the temperature is 65° and oxygen is admitted into the pressure tank B until the hand 81 stands at $82^a$ and the valve 60 is then closed and the valve 55 opened there will escape through the pipe 52 exactly one liter of oxygen at such temperature of 65°. In the same manner, for example, the mark $82^c$ is so located that if the apparatus is to be used in a room at a temperature of 75° Fahrenheit, oxygen must be admitted into the pressure tank B until the hand 81 stands at $82^c$ in order that after the valve 60 is closed and the valve 55 opened, exactly one liter of oxygen will escape into the compartment 31 through the pipe 52. It will be seen, therefore, that, by this construction, at any known temperature, there may very easily be admitted into the pressure tank B a sufficient quantity of oxygen by means of the valve 60, so that after the valve 60 is closed, and the valve 55 opened, there will escape into the compartment 31 through the pipe 52 a quantity of oxygen of predetermined volume; for example, one liter.

In the operation of the device, the patient or subject takes the mouthpiece F into his mouth, and the nostrils are closed so that all gas inhaled and exhaled passes through the breathing tube E. The three way valve 26 is then turned so that communication into the compartment 30 is cut off and outlet from the tube E is afforded through the valve 26 and outlet port 27. When the device is so set the patient may breathe normally for a short time in order to become accustomed to the device and in order to properly place the mouthpiece F so that there will be no leakage. During such time the breathing bag D is collapsed. As this preliminary breathing is going on, the temperature of the room is noted, the valve 55 is closed, and the valve 60 is opened until the hand 81 on the gage G coincides with the proper mark 82, $82^a$, or $82^b$, etc., corresponding to the room temperature noted. The valve 60 is then closed. In the event that too much gas is allowed to flow into the pressure tank B so that the hand 81 goes beyond the mark a small amount may be allowed to escape by means of loosening the screws 76 so that a slight amount of oxygen may leak out until the amount 81 reaches the correct mark. When the hand is at the correct mark the screw 76 must be tight, and the valve 60 and 55 tightly closed so that the hand will stand at this mark. When the device is so set the breathing of the patient is noted and immediately at the end of an inspiration the valve 26 is turned to the position shown in Fig. 6. This marks the starting point of the test. It will be noted that at this starting point the patient has his lungs full of ordinary gases as inhaled from the room, and the bag D is collapsed. The next expiration of the patient will pass into the charcoal container A downwardly through the compartment 30 under the partition 32 upwardly through the compartment 31. During the passage of the gases from the lungs thus through the charcoal and sodium hydroxide in the charcoal container, some of the carbon dioxide gas is taken up or absorbed by the charcoal and sodium hydroxide solution in accordance with the well known mechanical and chemical properties of these substances. It is the function of the charcoal and the sodium hydroxide solution to thus remove the carbon dioxide from the gases exhaled by the patient. At this point it may be noted that although I have shown and described charcoal and a sodium hydroxide solution for this purpose, it is obvious that any other chemicals, substances, or apparatus that will so remove the carbon dioxide gas from the gases passing through, might be used in the device, without detracting from the spirit of this invention. The carbon dioxide thus removed from the gases exhaled by the patient was formed in the lungs of the patient from the oxygen in the gases originally breathed in. The remaining gases from the expiration will pass through the pipe 28 into the breathing bag D expanding it to a certain extent. At this point the valve 55 is opened allowing the escape through the pipe 52 of a predetermined quantity of oxygen, as explained before. For example, one liter of oxygen is thus allowed to escape into the compartment 31 at the top and through the pipe 28 and into the breathing bag D expanding it still more. This mixes with the gases just exhaled by the patient and is designed to provide oxygen in such gases to replace that which was removed by the removal of carbon dioxide as explained before. At the next inspiration by the patient the gases previously exhaled with the new oxygen mixed therewith is again drawn into the lungs, passing however from the breathing bag D through the port 34 instead of down through the charcoal, since the former is the easier and more direct passage. Some more of the oxygen is consumed in the lungs, or taken up by the body, in accordance with well known physiological reactions to form carbon dioxide which is exhaled at the next expiration and partly absorbed by the passage of the gases through the charcoal as explained before; the remaining gases again entering the breathing bag D. The breathing process is thus continued, some of the carbon dioxide formed in the lungs being taken up by the charcoal and sodium hydroxide solution at each expiration, until the definite quantity of oxygen admitted from the pressure tank B has been entirely consumed. This point may be exactly noted, and will occur when the breathing bag is again entirely collapsed immediately at the end of an inspiration. It will be recalled that at the commencement of the test the bag D was entirely so collapsed. In other words, the operation of the device in this manner will show that the patient consumed an exact quantity of oxygen, for example one liter, during the time elapsed between the starting point noted at the end of the inspiration when the valve 26 was turned, and the time noted at the end of another inspiration when the bag D had again collapsed.

What I claim as new and desire to secure by Letters Patent is:

1. In a device of the character described, an extensible breathing bag adapted to retain gases exhaled into it and permit their reinspiration, means for removing the carbon dioxide gas from such gases, and means for introducing into such gases a predetermined quantity of oxygen, such means comprising an oxygen measuring tank connected to the breathing bag, and an oxygen supply tank connected to the oxygen measuring tank.

2. In a device of the character described, an extensible breathing bag adapted to retain gases exhaled into it and permit their reinspiration, means for removing the carbon dioxide gas from such gases, and means for introducing into such gases a predetermined quantity of oxygen, such means comprising an oxygen measuring tank, with a pressure gauge, connected to the breathing bag, and an oxygen supply tank connected to the oxygen measuring tank.

3. In a device of the character described, an extensible breathing bag adapted to retain gases exhaled into it and permit their reinspiration, means for removing the carbon dioxide gas from such gases, and means for introducing into such gases a predetermined quantity of oxygen, such means comprising an oxygen measuring tank connected to the breathing bag, a valve controlling the connection between the oxygen measuring tank and the breathing tank, and an oxygen supply tank connected to the oxygen measuring tank.

4. In a device of the character described, an extensible breathing bag adapted to retain gases exhaled into it and permit their reinspiration, means for removing the carbon dioxide gas from such gases, and means for introducing into such gases a predetermined quantity of oxygen, such means comprising an oxygen measuring tank connected to the breathing tank, a manually operated valve controlling the connection between the oxygen measuring tank and the breathing bag, and an oxygen supply tank connected to the oxygen measuring tank.

5. In a device of the character described, an extensible breathing bag adapted to retain gases exhaled into it and permit their reinspiration, means for removing the carbon dioxide gas from such gases, and means for introducing into such gases a predetermined quantity of oxygen, such means comprising an oxygen measuring tank, with a pressure gauge, connected to the breathing bag, a valve controlling the connection between the oxygen measuring tank and the breathing tank, and an oxygen supply tank connected to the oxygen measuring tank.

6. In a device of the character described, an extensible breathing bag adapted to retain gases exhaled into it and permit their reinspiration, means for removing the carbon dioxide gas from such gases, and means for introducing into such gases a predetermined quantity of oxygen, such means comprising an oxygen measuring tank, with a pressure gauge, connected to the breathing tank, a manually operated valve controlling the connection between the oxygen measuring tank and the breathing bag, and an oxygen supply tank connected to the oxygen measuring tank.

7. In a device of the character described, an extensible breathing bag adapted to retain gases exhaled into it and permit their reinspiration, means for removing the carbon dioxide gas from such gases, and means for introducing into such gases a predetermined quantity of oxygen, such means comprising an oxygen measuring tank connected to the breathing bag, and an oxygen supply tank connected to the oxygen measuring tank, such oxygen measuring tank being provided with a pressure gauge adjusted to indicate the pressure of oxygen required therein in order to permit the flow therefrom of such predetermined quantity of oxygen at atmospheric pressure into the breathing bag, and a valve controlling the connection between the oxygen measuring tank and the breathing bag.

8. In a device of the character described, an extensible breathing bag adapted to retain gases exhaled into it and permit their reinspiration, means for removing the carbon dioxide gas from such gases, and means for introducing into such gases a predetermined quantity of oxygen, such means comprising an oxygen measuring tank connected to the breathing bag, and an oxygen supply tank connected to the oxygen measuring tank, such oxygen measuring tank being provided with a pressure gauge adjusted to indicate the pressure of oxygen required therein at a given temperature in order to permit the flow therefrom of such predetermined quantity of oxygen at atmospheric pressure into the breathing bag, and a valve controlling the connection between the oxygen measuring tank and the breathing bag.

9. In a device of the character described, a standard, an oxygen measuring tank detachably secured to the standard, and a carbon dioxide remover detachably secured to the oxygen measuring tank.

10. In a device of the character described, a standard, an oxygen measuring tank detachably secured to the standard, a carbon dioxide remover detachably secured to the oxygen measuring tank, and an oxygen supply tank detachably secured to the oxygen measuring tank.

11. In a device of the character described, a standard, an oxygen measuring tank detachably secured to the standard, a carbon dioxide remover detachably connected to the oxygen measuring tank, and a valve controlling connection between the carbon dioxide remover and the oxygen measuring tank.

In testimony whereof I have hereunto set my hand this 12th day of July, 1920.

HORRY M. JONES.